(12) United States Patent
Samra

(10) Patent No.: US 6,275,926 B1
(45) Date of Patent: Aug. 14, 2001

(54) SYSTEM AND METHOD FOR WRITING BACK MULTIPLE RESULTS OVER A SINGLE-RESULT BUS AND PROCESSOR EMPLOYING THE SAME

(75) Inventor: Nicholas G. Samra, Plano, TX (US)

(73) Assignee: VIA-Cyrix, Inc., Plano, TX (US)

( * ) Notice: Subject to any disclaimer, the term of this patent is extended or adjusted under 35 U.S.C. 154(b) by 0 days.

(21) Appl. No.: 09/285,609

(22) Filed: Apr. 2, 1999

(51) Int. Cl.$^7$ .............................. G06F 12/04; G06F 13/20; G06F 13/40; G06F 13/22

(52) U.S. Cl. .......................... 712/210; 712/33; 710/129; 710/127; 710/66; 710/21

(58) Field of Search .................................. 708/603.7, 523, 708/533, 620, 324; 714/25; 712/1, 8, 36, 42, 23, 30, 15, 204, 210, 33; 711/209, 214; 710/9, 65, 66, 127, 129, 21

(56) References Cited

U.S. PATENT DOCUMENTS 4,903,264 * 2/1990 Talgam et al. ...................... 714/25
5,859,789 * 1/1999 Sidwell .............................. 708/603

* cited by examiner

Primary Examiner—Daniel H. Pan
(74) Attorney, Agent, or Firm—Carr & Ferrell, LLP

(57) ABSTRACT

For use in a processor having a result bus of insufficient width to convey all results of a given multiple-result instruction concurrently, a system for, and method of, writing back the results of the multiple-result instruction. In one embodiment, the system includes: (1) multi-result node creation circuitry that creates a multi-result node having at least first and second results for the multiple-result instruction and (2) node transmission circuitry, coupled to the multi-result node creation circuitry, that transmits the first and second results of said multi-result node sequentially over the result bus.

28 Claims, 4 Drawing Sheets

US 6,275,926 B1

SYSTEM AND METHOD FOR WRITING BACK MULTIPLE RESULTS OVER A SINGLE-RESULT BUS AND PROCESSOR EMPLOYING THE SAME

TECHNICAL FIELD OF THE INVENTION

The present invention is directed, in general, to processors and, more specifically, to a system and method for writing back multiple results within the confines of a single-result bus and a processor employing the same.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, a practical maximum exists to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized.

Statistically, certain instructions are executed more frequently than others. If the design of a processor is optimized to rapidly process the instructions which occur most frequently, then the overall throughput of the processor can be increased. Unfortunately, the optimization of a processor for certain frequent instructions is usually obtained only at the expense of other less frequent instructions, or requires additional circuitry, which increases the size of the processor.

One area in which less frequent instructions have dictated a compromise in design is in the area of multiple-result instruction processing. For each result of an instruction, a portion of a bus must be used to pass the result from an execution unit to the physical register file. For example, in 32 bit microprocessor architectures that has instructions with two results, the microprocessor uses two 32 bit buses to pass the instruction's two results from the execution unit to the physical register file. The most common instructions that contain two or more results are the divide and the multiply instructions.

Microprocessors use multiple result buses to reduce the time required to process these less frequent instructions. However, the additional circuitry required to implement theses additional buses increase the size of the processor and increase the processor's power usage. Therefore, what is needed in the art is a way to process multiple-result instructions without the cost of additional result buses.

SUMMARY OF THE INVENTION

To address the above-discussed deficiencies of the prior art, it is a primary object of the present invention to provide a way to write back the results of instructions that have more results than the result bus can convey in parallel.

In the attainment of the above primary object, the present invention provides, for use in a processor having a result bus of insufficient width to convey all results of a given multiple-result instruction concurrently, a system for, and method of, writing back the results of the multiple-result instruction. In one embodiment, the system includes: (1) multi-result node creation circuitry that creates a multi-result node having at least first and second results for the multiple-result instruction and (2) node transmission circuitry, coupled to the multi-result node creation circuitry, that transmits the first and second results sequentially over the result bus.

The present invention introduces the broad concept of employing multi-result nodes (nodes employed for the purpose of carrying results) to convey one or more of the results of a multi-result instruction. This allows the result bus to convey more results for a given instruction than could be otherwise conveyed were all the results to be conveyed at one time.

In one embodiment of the present invention, the result bus has a width sufficient to convey only one result. However, the broad scope of the present invention contemplates a result bus capable of conveying two or more results in parallel.

In one embodiment of the present invention, the multiple-result instruction is a two-result instruction. Those skilled in the pertinent art will understand, however, that the present invention broadly applies to instructions having two or more results, as long as the result bus is narrower than the number of results.

In one embodiment of the present invention, the node creation circuitry and the node transmission circuitry are contained within an execution unit and associated with a writeback stage of a pipeline. In an embodiment to be illustrated and described, the processor contains three execution units coupled to a single result bus and associated with the writeback stage of a pipeline. Each of the execution units has multi-result node creation circuitry and node transmission circuitry.

In one embodiment of the present invention, the node transmission circuitry transmits the first result before the second result. The results are preferably tagged and tracked so as to be written back to the physical register file following transmission over the result bus. Alternatively, the transmission circuitry transmits the second result before the first result.

In one embodiment of the present invention, the multi-result node includes first and second node tags associated with the first and second results, respectively. Those skilled in the pertinent art will understand, however, that the present invention broadly applies to instructions having two or more results, in which there is a node tag associated with each result of the multiple-result instruction.

In one embodiment of the present invention, the node transmission circuitry broadcasts the first node tag to indicate the availability of the first result apart from the second result. Alternatively, the transmission circuitry broadcasts the second node tag to indicate the availability of the second result apart from the first result.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

1. Integrated Processor System

Figure 1:
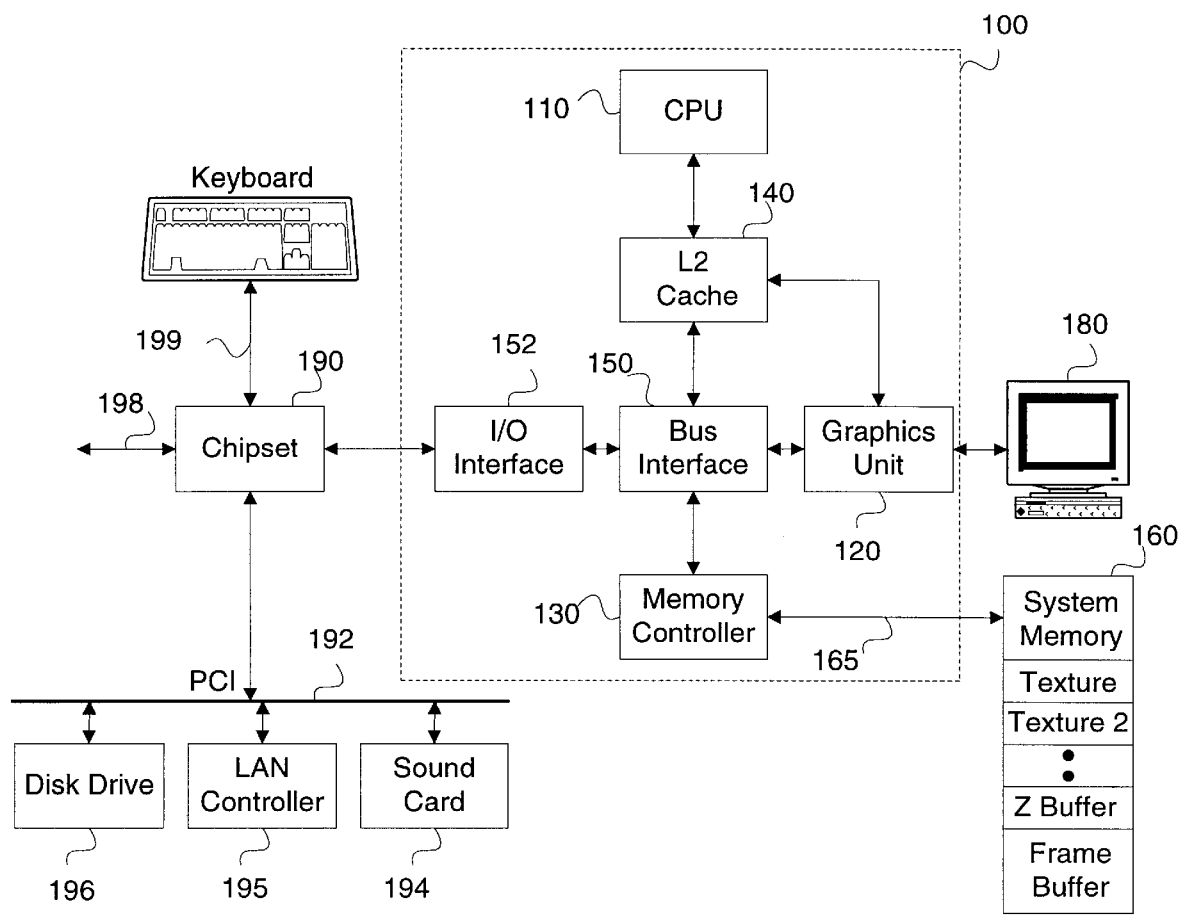
FIG. 1 illustrates an exemplary integrated processor system including an exemplary integrated microprocessor.

Referring initially to FIG. 1, illustrated is an exemplary integrated processor system, including an integrated microprocessor 100. The integrated microprocessor 100 includes a CPU 110 with dual integer and dual floating point execution units, separate load/store and branch units, and L1 instruction and data caches. Integrated onto the microprocessor die is a graphics unit 120, a system memory controller 130, an L2 cache 140 shared by the CPU and the graphics unit 120. A bus interface unit 150 interfaces the CPU 110, graphics unit 120, and L2 cache 140 to the memory controller 130.

The integrated memory controller 130 bridges the processor 100 to system memory 160, and may provide data compression/decompression to reduce bus traffic over the external memory bus 165 which preferably, although not exclusively, has a RAMbus™, fast SDRAM or other type protocol. The integrated graphics unit 120 provides TFT, DSTN, RGB or other type of video output to drive display 180.

The bus interface unit 150 interfaces, through an I/O interface 152, the processor 100 to a chipset bridge 190 for a conventional peripheral bus 192 (e.g. PCI) connection to peripherals such as sound card 194, LAN controller 195, disk drive 196 as well as a fast serial link 198 (e.g. IEEE 1394 "firewire" bus and/or universal serial bus "USB") and a relatively slow I/O port 199 for peripherals such as keyboard and mouse. Alternatively, chipset bridge 190 may integrate local bus functions such as sound, disk drive control, modem, network adapter, etc.

2. Integrated CPU

Figure 2:
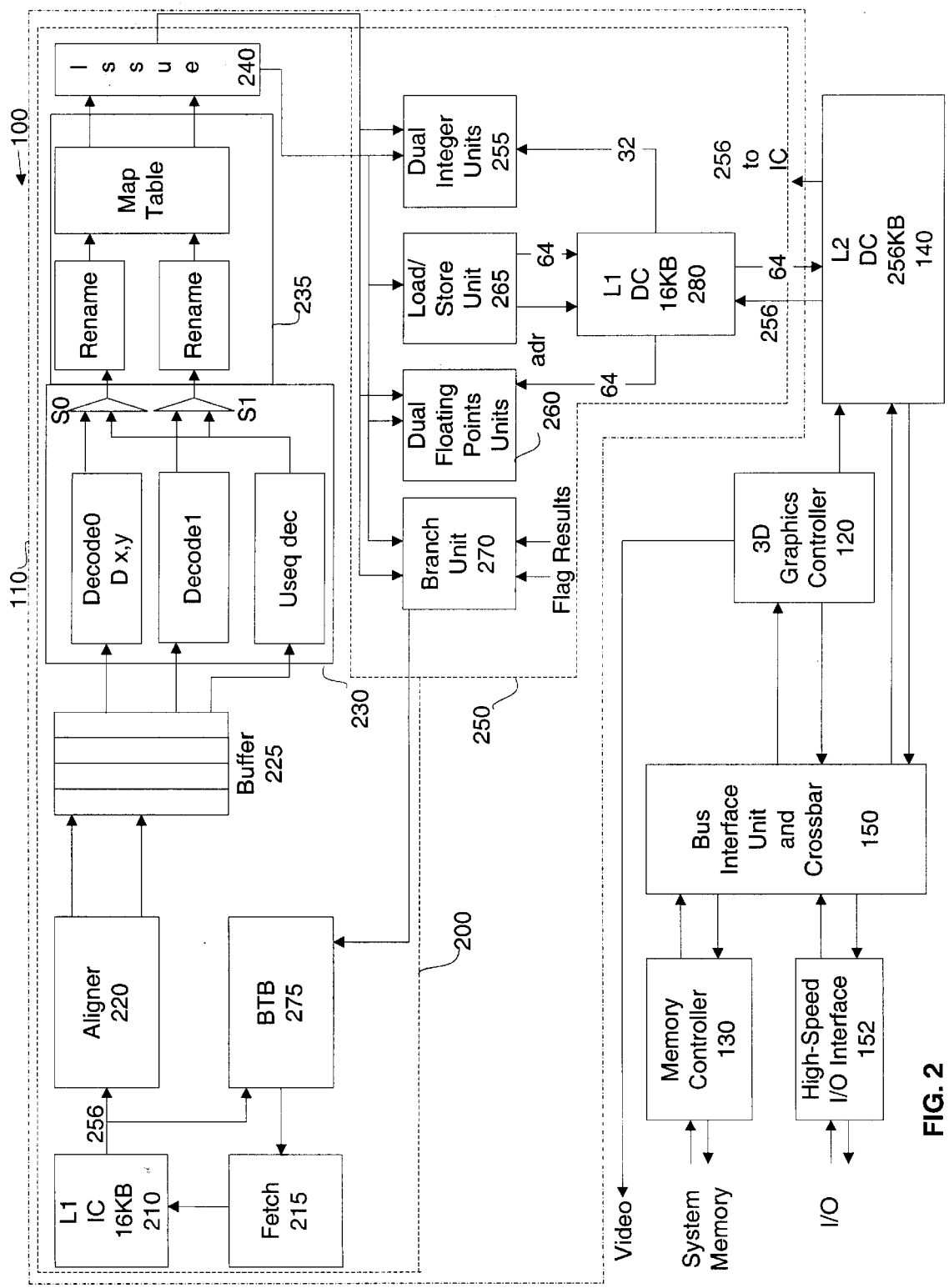
FIG. 2 illustrates, in more detail, the exemplary integrated microprocessor of FIG. 1.

FIG. 2 illustrates in more detail the exemplary integrated microprocessor 100, including CPU 110 integrated with graphics controller 120, memory controller 130, and L2 unified cache 140 (256 KB). CPU 110 includes an execution pipeline with instruction decode/dispatch logic 200 and functional units 250.

Instruction decode/dispatch logic 200 decodes variable length x86 instructions into nodes (operations) each containing source, destination, and control—each instruction maps into 1, 2, or more nodes, which are formed into checkpoints for issue in parallel to the functional units 250. The exemplary execution pipeline includes two integer units (EX) 255, two pipelined floating point units (FP) 260, a single load/store unit (LDST) 265, and a branch unit (BR) 270, so a single checkpoint can include up to 2 EX, 2 FP, 1 LDST, and 1 BR nodes which can be issued in parallel. An L1 data cache 280 (16 KB) receives data requests from the LDST unit 265, and in the case of an L1 hit supplies the requested data to the appropriate EX or FP unit.

The BR unit 270 executes branch operations based on flag results from the EX units 255—predicted (taken/not taken) and not-predicted (undetected) branches are resolved (mispredicts incur a 12 clock penalty), and branch information supplied to a BTB 275, including branch address, target address, and resolution (taken or not taken). The BTB 275 includes a 1 KB target cache, a 7-bit history and prediction ROM, and a 16 entry return stack.

Instruction decode/dispatch logic 200 includes an L1 instruction cache 210 (16 KB) storing 32-byte cache lines (8 dwords/4 qwords). For each fetch operation, a fetch unit 215 may direct the L1 instruction cache 210 to forward a cache line of 32 instructions bytes to the aligner logic 220 or, alternatively, the fetch unit 215 may fetch a cache line of 32 instruction bytes from the L1 instruction cache 210 and forwards the instruction bytes to aligner logic 220. The fetch unit 215 either (a) generates a fetch address by incrementing the previous fetch address (sequential fetch), or if the previous fetch address hit in the BTB 275, (b) switches the code stream by supplying the fetch address for the cache line containing the target address provided by the BTB 275. The fetch unit 215 supplies a linear address simultaneously to the L1 instruction cache 210 and the BTB 275—a two level TLB structure (a 32 entry L1 instruction TLB and a 256 entry shared L2 TLB) supplies a corresponding physical address to the L1 cache 210 to complete cache access.

Aligner logic 220 identifies up to two x86 variable length instructions per clock—instructions are buffered in an instruction buffer 225, along with decode and issue constraints. Decoder 230 transfers instructions from the instruction buffer to the appropriate one (as determined by decode constraints stored with the instruction) of decoders D0, D1, and User (a microsequencer)—D0 and D1 define two decode slots (or paths) S0 and S1, with the User decoder feeding nodes into both slots simultaneously.

D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to D0. The User decoder handles instructions that decode into more than two nodes/operations (e.g., far calls/returns, directs, segment register loads, floating point divides, floating point transcendentals)—each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units 250. Most instructions can be dual issued with the nodes for each in the same checkpoint—up to 16 checkpoints may be active (i.e., issued to the functional units 250).

Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX™ and 3Dnow™, as well as standard x87 floating point, instruction execution—FPU0 includes a pipelined FAdder and FPU1 includes a pipelined Fmultipler, both supporting packed SIMD operations.

Integer multiply operations are issued to FPUL with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

The single LDST unit 265 executes memory reference operations as loads/stores to/from the data cache 280 (or L2 cache 140). The LDST unit 265 performs pipelined linear address calculation and physical (paged) address translation, followed by data cache access with the physical (translated) address. Address translations are performed in order using a two level TLB structure (a 32 entry L1 data TLB and the 256 entry shared L2 TLB). Up to 4 pending L1 misses can be outstanding—miss data returns out of order (from either the L2 cache or system memory).

The exemplary 16 KB L1 instruction cache 210 is single-ported 4-way associative, with 2 pending misses. The exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, the L2 cache 140 transfers an entire cache line (32 bytes/256 bits) in one cycle with a 7 clock access latency for L1 misses that hit in the L2.

The exemplary 256 KB L2 cache 140 is 8-way associative and 8-way interleaved. The L2 cache 140 supports one L1 (code/data) miss per cycle and one L1 store or L2 fill per cycle provided that the L1 store or the L2 fill is to a different interleave than the L1 (code/data) miss. Portions or all of 2 of the 8 ways may be locked down for use by the graphics controller 120.

For integer register-register operations, the execution pipeline is 11 stages from code fetch to completion: two cache access stages IC1 and IC2, two alignment stages AL1 and AL2, three decode/rename stages DEC0–DEC2, checkpoint issue stage ISS, and reservation stage RS, followed by the execute and result write-back/forward stages EX and WB. For integer register-memory operations, the LDST unit pipeline adds an additional 4 stages between RS and EX: address calculation AC, translation XL, and data cache access and drive back DC and DB. The floating point adder pipeline is 4 stages, and the floating point multiply pipeline is 5 stages.

3. Flow Diagram of Multi-Result Node Processing

Figure 3:
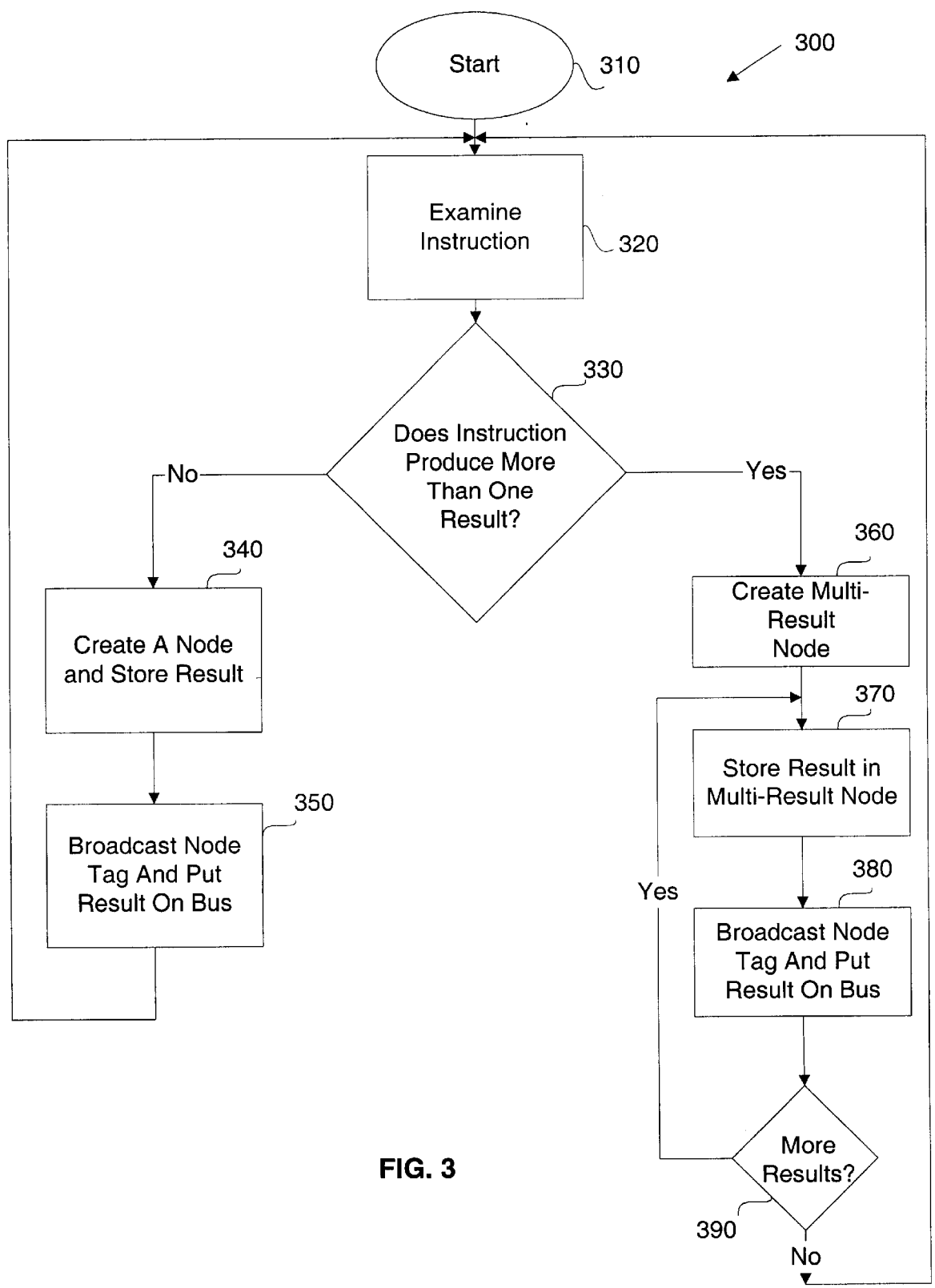
FIG. 3 illustrates a flow diagram of a method of creating and processing multi-result nodes associated with multiple-result instructions.

Turning now to FIG. 3, illustrated is a flow diagram of a method of creating and processing multi-result nodes associated with multiple-result instructions. In FIG. 3, one of the functional units ("FU") 250 first performs initialization and starts processing an instruction in its associated execution unit in a step 310. (See FIG. 4 for a more detailed description of execution units).

After the FU 250 has started executing an instruction, the FU 250 examines the x86 instruction currently executing in a step 320. Next the FU 250 determines if the x86 instruction produces more than one result in a decisional step 330.

If the x86 instruction does not produce more than one result, the FU 250 creates a node and stores the x86 instruction's result in the node when the result is available in a step 340. Next, the FU 250 broadcasts the node tag on a tag bus 410, to be described in greater detail in FIG. 4, in a step 350. The FU 250 also transmits the result on a result bus 480, to be described in greater detail in FIG. 4. In an alternative embodiment of the present invention, the FU 250 transmits the result on the result bus 480 prior to broadcasting the node tag on the tag bus 410. The FU 250 then examines the next x86 instruction in the step 320.

If the x86 instruction produces more than one result, the FU 250 creates a multi-result node in a step 360. Next, the FU 250 stores one of the x86 instruction's results in the multi-result node when the result is available in a step 370. Then, the FU 250 broadcasts the node tag associated with the stored result on the tag bus 410 and transmits the result on the result bus 480 in a step 380.

The FU 250 then determines if there are more results to process in a decisional step 390. If there are more results to process, the FU 250 stores the next result, when available, in the multi-result node in the step 370. If there are no more results to process, the FU 250 then examines the next x86 instruction in the step 320.

An example of a x86 instruction that contains more than one result is the DIV instruction which produces a 32-bit quotient and a 32-bit remainder. The FU 250 creates a multi-result node for the DIV instruction and stores the quotient as the first result. Next, the FU 250 broadcasts the node tag associated with the quotient on the tag bus 410. The FU 250 also transmits the quotient on the result bus 480.

When the DIV instruction's remainder is available, the FU 250 stores the remainder in the multi-result node. Then, the FU 250 broadcasts the node tag associated with the remainder on the tag bus 410. The FU 250 also transmits the remainder on the result bus 480.

One skilled in the art should know that the present invention is not limited to only x86 instructions. Nor is the present invention limited to processing multiple-result instructions that produce only two results. In other embodiments of the present invention, the order and the time between broadcasting a node tag and the transmission of the result on the result bus can vary. Other embodiments of the present invention may have additional or fewer steps than described above.

4. Functional Unit Block Diagram

Figure 4:
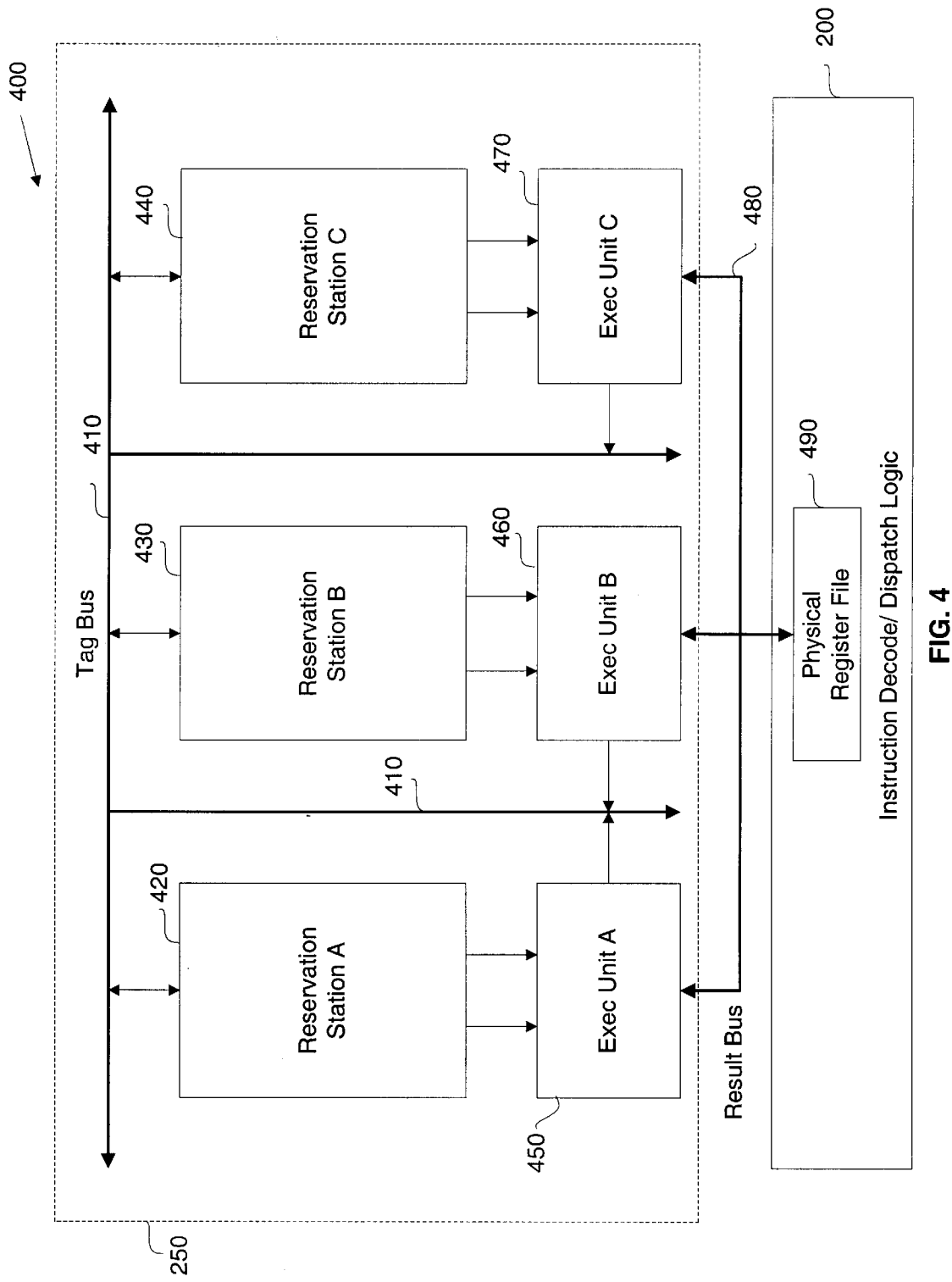
FIG. 4 illustrates a block diagram of one of the exemplary integrated microprocessor's functional units constructed according to the principles of the present invention.

Turning now to FIG. 4, illustrated is a block diagram of one of the exemplary integrated microprocessor's functional units 250 constructed according to the principles of the present invention. In the illustrated embodiment of the present invention, each of the functional units ("FU") 250 comprise a tag bus 410, a reservation station A ("RSA") 420, an execution unit A ("EUA") 450, a reservation station B ("RSB") 430, an execution unit B ("EUB") 460, a reservation station C ("RSC") 440 and an execution unit C ("EUC") 470. Other embodiments of the present invention may comprise additional or fewer reservation stations and/or execution units.

The tag bus 410 is coupled to RSA 420, RSB 430, RSC 440, EUA 450, EUB 460 and EUC 470. EUA 450 is coupled to RSA 420 and processes RSA's nodes. EUB 460 is coupled to RSB 430 and processes RSB's nodes. EUC 470 is coupled to RSC 440 and processes RSC's nodes. In another embodiment of the present invention, a single reservation station may be coupled to two or more execution units. Each of the execution units performs the appropriate functions according to the type of functional unit it is. In one embodiment of the present invention, the functional units comprise the EX, FPU, BR and LDST.

Contained within the instruction decode/dispatch logic 200 is a physical register file 490. Coupled to the instruction decode/dispatch logic 200 and the physical register file 490 is the result bus 480. The result bus 480 is also coupled to the EUA 450, EUB 460 and EUC 470.

In one embodiment of the present invention, EUA 450, EUB 460 and EUC 470 are capable of accommodating multiple-result instructions that have more results then the number of result buses available. In the illustrated embodiment, EUA 450, EUB 460 and EUC 470 comprise a multi-result node creation circuitry and a node transmission circuitry coupled to the multi-result node creation circuitry. The multi-result node creation circuitry creates a multi-result node having at least first and second results. The node transmission circuitry transmits the first and second results sequentially over the result bus to the physical register file 490. The node transmission circuitry also broadcasts a node tag associated with each result on the tag bus 410.

The FU 250 uses a node tag to uniquely identify a node or a node's result for dependency resolution. The FU 250 uses the tag bus 410 to transmit the node tags to RSA 420, RSB 430 and RSC 440. RSA 420, RSB 430 and RSC 440 also use the tag bus 410 to transmit node tags between each other.

One example of a multiple-result instruction is the DIV instruction. The DIV instruction produces two 32-bit results, a quotient and a remainder. In one embodiment of the present invention, RSA 420 contains the multiple-result DIV instruction and creates a node tag for each result that will be produced by the multi-result instruction. RSA 420 sends the multiple-result DIV instruction and the associated node tags to EUA 450.

EUA 450 starts executing the DIV instruction and EUA's multi-result node creation circuitry creates a multi-result node. When the DIV's quotient is available, EUA 450 stores the quotient in the multi-result node. EUA's node transmission circuitry broadcasts the quotient's node tag on the tag bus 410 and transmits the quotient on the result bus 480. The instruction decode/dispatch logic 200 retrieves the quotient from the result bus 480 and stores the quotient in the physical register file 490. EUB 460 and EUC 470 can also retrieve the quotient from the result bus 480 to complete the execution of another instruction that was dependent upon the DIV's quotient.

When the DIV's remainder is available, EUA 450 stores the remainder in the multi-result node. EUA's node transmission circuitry broadcasts the remainder's node tag on the tag bus 410 and transmits the remainder on the result bus 480. The instruction decode/dispatch logic 200 retrieves the remainder from the result bus 480 and stores the remainder in the physical register file 490. EUB 460 and EUC 470 can also retrieve the remainder from the result bus 480 to complete the execution of another instruction that was dependent upon the DIV's remainder.

The advantage of the present invention is twofold. First, the present invention is capable of processing instructions containing more results than the number of result buses available. Second, the present invention allows other instruction to use a result as it becomes available and not wait until all results of a multiple-result instruction are available. The present invention saves valuable processor real estate and allows faster processing of multiple-result instructions.

One skilled in the art should note that the above description is not limited to reservation station A and execution unit A and applies to all reservation stations and execution units. Also, the present invention is not limited to the processing of multiple-result instructions containing only two results. In other embodiments of the present invention, the present invention can process multiple-result instructions that produce more than two results.

Also, one skilled in the art should note that no absolute order of transmission of results to the result bus 480 is intended or implied. One skilled in the art should also note that no absolute order between broadcasting the result's node tag and transmitting the result to the result bus is intended or implied. Also, other embodiments of the present invention may have additional or fewer steps or procedures than described.

From the above, it is apparent that the present invention provides, for use in a processor having a result bus of insufficient width to convey all results of a given multiple-result instruction concurrently, a system for, and method of, writing back the results of the multiple-result instruction. In one embodiment, the system includes: (1) multi-result node creation circuitry that creates a multi-result node having at least first and second results for the multiple-result instruction and (2) node transmission circuitry, coupled to the multi-result node creation circuitry, that transmits the first and second results of said multi-result node sequentially over the result bus.

Although the present invention and its advantages have been described in detail, those skilled in the art should understand that they can make various changes, substitutions and alterations herein without departing from the spirit and scope of the invention in its broadest form.

What is claimed is:

1. For use in a processor having a result bus of insufficient width to convey all results of a given multiple-result instruction concurrently, a system for writing back said results of said multiple-result instruction, comprising:

multi-result node creation circuitry that creates a multi-result node having at least first and second results for said multiple-result instruction; and node transmission circuitry, coupled to said multi-result node creation circuitry, that transmits said first and second results of said multi-result node sequentially over said result bus.

2. The system as recited in claim 1 wherein said result bus has a width sufficient to convey only one result.

3. The system as recited in claim 1 wherein said multiple-result instruction is a two-result instruction.

4. The system as recited in claim 1 wherein said multi-result node creation circuitry and said node transmission circuitry are contained within an execution unit and associated with a writeback stage of a pipeline.

5. The system as recited in claim 1 wherein said node transmission circuitry transmits said first result before said second result.

6. The system as recited in claim 1 wherein said multi-result node further comprises first and second node tags associated with said first and said second results, respectively.

7. The system as recited in claim 6 wherein said node transmission circuitry broadcasts said first node tag to indicate the availability of said first result apart from said second result.

8. For use in a processor having a result bus of insufficient width to convey all results of a given multiple-result instruction concurrently, a system for writing back said results of said multiple-result instruction, comprising:

means for creating a multi-result node having at least first and second results for said multiple-result instruction; and means, coupled to said means for creating, for transmitting said first and second results of said multi-result node sequentially over said result bus.

9. The system as recited in claim 8 wherein said result bus has a width sufficient to convey only one result.

10. The system as recited in claim 8 wherein said multiple-result instruction is a two-result instruction.

11. The system as recited in claim 8 wherein said means for creating and said means for transmitting are contained within a writeback stage of a pipeline.

12. The system as recited in claim 8 wherein said means for transmitting transmits said first result before said second result.

13. The system as recited in claim 8 wherein said multi-result node further comprises first and second node tags associated with said first and said second results, respectively.

14. The system as recited in claim 13 further comprising a means of broadcasting said first node tag to indicate the availability of said first result apart from said second result.

15. For use in a processor having a result bus of insufficient width to convey all results of a given multiple-result instruction concurrently, a method of writing back said results of said multiple-result instruction, comprising:

creating a multi-result node having at least first and second results for said multiple-result instruction; and transmitting said first and second results of said multi-result node sequentially over said result bus.

16. The method as recited in claim 15 wherein said result bus has a width sufficient to convey only one result.

17. The method as recited in claim 15 wherein said multiple-result instruction is a two-result instruction.

18. The method as recited in claim 15 wherein said creating and said transmitting are carried out within a writeback stage of a pipeline.

19. The method as recited in claim 15 wherein said transmitting comprises transmitting said first result before said second result.

20. The method as recited in claim 15 wherein said multi-result node further comprises first and second node tags associated with said first and said second results, respectively.

21. The method as recited in claim 20 further comprising a means of broadcasting said first node tag to indicate the availability of said first result apart from said second result.

22. A computer system, comprising:

(a) a processor having an integer execution core containing at least two execution result buses for executing instructions and of insufficient width to convey all results of a given multiple-result instruction concurrently, said processor capable of addressing segments of system memory coupled thereto;

(b) system memory for storing instructions;

(c) said processor including decode units for decoding an ordered stream of instructions fetched from said system memory; and (d) a system for writing back said results of said multiple-result instruction, including:

(i) multi-result node creation circuitry that creates a multi-result node having at least first and second results for said multiple-result instruction, and (ii) node transmission circuitry, coupled to said multi-result node creation circuitry, that transmits said first and second results of said multi-result node sequentially over said result bus.

23. The computer system as recited in claim 22 wherein said result bus has a width sufficient to convey only one result.

24. The computer system as recited in claim 22 wherein said multiple-result instruction is a two-result instruction.

25. The computer system as recited in claim 22 wherein said multi-result node creation circuitry and said node transmission circuitry are contained within an execution unit and associated with a writeback stage of a pipeline.

26. The computer system as recited in claim 22 wherein said node transmission circuitry transmits said first result before said second result.

27. The computer system as recited in claim 22 wherein said multi-result node further comprises first and second node tags associated with said first and said second results, respectively.

28. The computer system as recited in claim 27 wherein said node transmission circuitry broadcasts said first node tag to indicate the availability of said first result apart from said second result.

* * * * *